United States Patent [19]
Bishton

[11] 3,835,907
[45] Sept. 17, 1974

[54] PNEUMATIC TIRES
[75] Inventor: Albert A. Bishton, Birmingham, England
[73] Assignee: The Dunlop Company Limited, London, England
[22] Filed: Sept. 29, 1971
[21] Appl. No.: 184,928

Related U.S. Application Data
[63] Continuation of Ser. No. 837,588, June 30, 1969, abandoned.

[30] Foreign Application Priority Data
July 11, 1968 Great Britain.................... 33012/68

[52] U.S. Cl................................. 152/153, 152/330
[51] Int. Cl............................................ B60c 19/06
[58] Field of Search............ 152/153, 353, 354, 330

[56] References Cited
UNITED STATES PATENTS
2,007,825  7/1935  Day.................................... 152/153

Primary Examiner—James B. Marbert
Attorney, Agent, or Firm—Stevens, Davis, Miller & Mosher

[57] ABSTRACT
A tubeless tire, especially for an aircraft provided with venting means in the sidewall and/or bead regions comprising one or more substantially continuous circumferential grooves of a depth so as to leave only a thin layer of thickness 1mm, or less of rubber externally of the reinforcing cords of the tire, each groove being provided with a plurality of penetrations each of a depth of about 2-3 cords.

7 Claims, 3 Drawing Figures

PATENTED SEP 17 1974 3,835,907
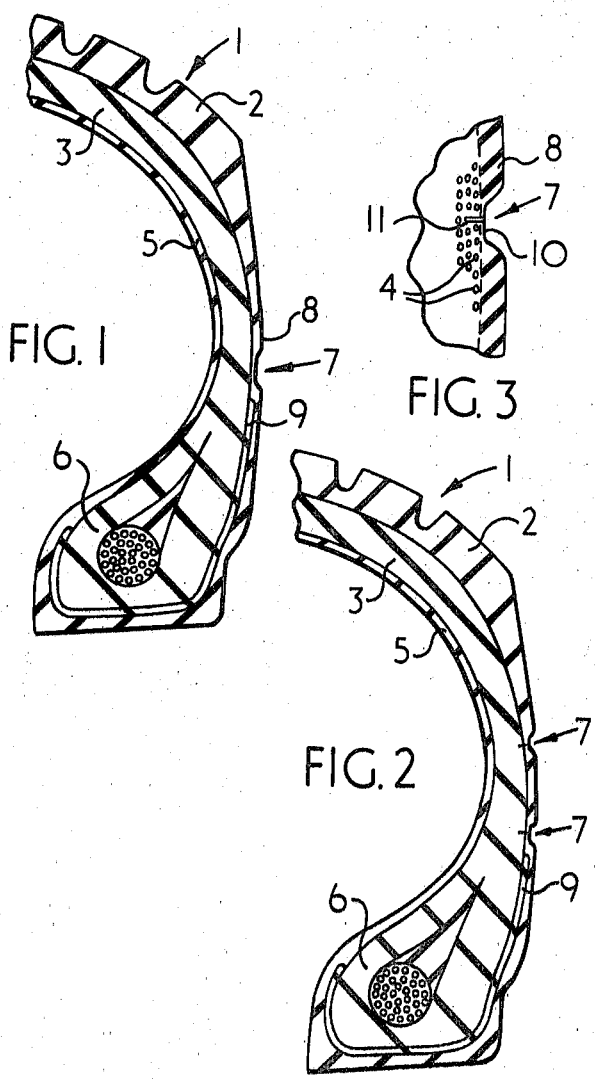

PNEUMATIC TIRES

This application is a continuation of U.S. application Ser. No. 837,588 filed June 30, 1969, now abandoned.

This invention relates to pneumatic tires and particularly to tubeless pneumatic tires.

It is well-known that tubeless tires are prone to the danger of seepage of inflationary air into the body of the carcass and along the reinforcing cords, the fault manifesting itself, particularly in the case of tires subject to very high inflation pressure, e.g. 200 to 300 pounds per square inch, and possibly to high temperature usage and high speed operation, in the formation on the sidewall of the tire of large blisters separating the sidewall rubber from the carcass reinforcing cords. Not only are these blisters unsightly but they can affect the performance of the tire. In the case of aircraft tires, where the clearance between the tire and wheel and the housing provided in the aircraft into which the tyre wheel is retracted usually is very small, a large blister is sufficient to prevent either retraction or subsequent lowering of the tire and wheel. Moreover the danger of the formation of blisters is increased under high temperature operation whether caused by ambient conditions or by tire performance.

It is an object of the present invention to reduce or eliminate the above-mentioned difficulties.

According to the invention there is provided a tubeless tire having a reinforcement of cords wherein each sidewall of bead region or both regions is or are provided with a substantially continuous circumferential groove in the exterior rubber thereof, so that a portion of rubber of substantially reduced thickness is provided at the base of the groove between it and the cords of the tire reinforcement, a plurality of penetrations in the groove base leading to and terminating at or amongst the said cords being provided whereby tire inflationary air which may be caused to seep into the said cords is enabled to escape preferably through the said penetrations.

The groove may, with advantage, be located on the sidewall closely adjacent to the radially outermost cord ends of a chafer strip which may be provided in the tire bead region. Preferably, the groove is located in a region of minimum sidewall rubber thickness and may be about 5 mm wide; preferably also the thickness of the rubber between the base of the groove and the outermost cord of the tire reinforcement is not greater than 1 mm., 1/2 mm. or less having been found to be most satisfactory.

It will be appreciated that more than one circumferential groove may be provided and while these grooves preferably are continuous they may not be continuous i.e. there may be a series of interrupted lengths; the amount of thicker rubber between the interrupted lengths should not be such as to enable blisters to form in the thicker rubber rather than in the comparatively thinner rubber at the base of the circumferential groove lengths.

The grooves can be formed either by moulding at the time of moulding the tire or subsequent thereto, rubber being removed from the sidewall by use of an appropriate tool. Preferably the groove, when viewed in cross-section, should have a curved shape so that the tendency to develop high stress, and thus cracking, in the rubber adjacent to the groove by the provision of sharp corners is reduced and the tendency to localize flexing at or in the region of the groove is reduced.

Again, the penetrations provided in the base of the groove may be formed during moulding or subsequent thereto, the penetrations being effected, e.g., by means of clean round smooth pins which are sharply pointed to create a penetration which has only a small tendency to cause tearing of the rubber at or between penetrations; the penetrations should extend into the core reinforcement preferably to a depth of two or three layers in the case of a multiple ply reinforced tire such as an aircraft tire. If the thickness of rubber at the base of the groove is in the region of one-half mm., a pin, which penetrates to its full depth, having a length of 2 or 3 mm. has been found to be effective. A pitch of 10 to 12 mm. between successive penetrations has been found to be satisfactory.

One embodiment of the invention will now be described only by way of example with references to the accompanying drawings of which;

FIG. 1 shows a partial cross-sectional view of a tyre according to the embodiment of the invention.

FIG. 2 shows a partial cross-sectional view of a tyre according to a modification of the embodiment shown in FIG. 1.

FIG. 3 shows a cross-sectional view of one of the sidewall grooves shown in FIG. 1 or 2 on an enlarged scale.

An aircraft tire comprising a conventional tread 2, a casing 3 comprising textile cords 4, an inner liner 5, and bead regions 6 is provided with a continuous groove 7, in the rubber of each sidewall 8 in its region where this rubber is the thinnest, this region being relatively closely adjacent to the radially outermost ends of the chafer cords 9, the groove 7 being of a depth such that only one-half mm. of rubber remains between the base 10 of the groove 7 and the outermost surface of the underlying reinforcing cords 4.

The groove width is 5 mm. its cross-section being arcuate in shape, no sharp corners being provided in the concave or convex portions of the cross-section so as to avoid localize stress concentration. A plurality of penetrating holes 11 are provided in the groove base to a depth of 3 mm. i.e. as to penetrate 2–3 layers of casing cords 4 and at a pitch of 10 mm.

The tire was inflated to over 300 pounds per square inch and was tested on a machine to the very high speed for which the tire was designed on simulated take-off and landing conditions, i.e., to a speed of over 200 mph.

On account of the extremely high inflation pressure and high temperatures developed during the test some of the inflationary air was caused to seep into the casing 3 but no blisters whatsoever were formed outside the confines of the groove 7, small blisters being formed within the groove 7 in the region of the penetrations and the air forming the blister was quickly caused to be released by the penetrations 11 provided in the groove base. No looseness between sidewall rubber and the external layer of reinforcing cords was created outside the confines of the grooves.

While the embodiment just described relates to a tire having one groove 7 only in each sidewall 8 of the tire 1, as a modification two or more grooves may be provided in each sidewall in instances where this is found to be desirable. A tire having two grooves in each sidewall is illustrated in FIG. 2.

The advantages of the present invention will be readily appreciated by those skilled in the art particularly in applications such as are not required and as are envisaged for the future where, in the case of aircraft tires, e.g., those for military aircraft, extremely high "skin" temperatures are created on the aircraft fuselage by air friction at supersonic speeds which have the effect of heating up the tire in its compartment prior to landing so that the tire already is caused to reach a very high temperature even before the further increase of temperature which undoubtedly would be caused by the landing operation.

Having now described my invention what I claim is:

1. A tubeless tire having a reinforcement of rubberized cords wherein the improvement comprises the provision of at least one substantially continuous annular groove in the exterior rubber of the region of the tire located radially inward of the tire shoulder, said groove extending inwardly to approximately the reinforcement cords leaving only a portion of rubber of substantially reduced thickness to provide a very thin base for the groove between it and the said cords, and a plurality of minute penetrations annularly arranged around the tire in the thin groove base which lead to and terminate within the reinforcement, whereby any air accumulating in pockets within the reinforcement is permitted to readily escape and large accumulations of air in localized areas of the reinforcement such as may cause injurious blisters on the tire are avoided.

2. A tubeless tire according to claim 1 wherein the groove is located in the sidewall closely adjacent the radially outermost cord ends of a chafer strip provided in the tire bead region.

3. A tubeless tire according to claim 1 wherein the groove is located on the sidewall in a region of minimum sidewall rubber thickness, the sidewall thickness immediately adjacent the groove being no thicker than the rubber elsewhere in the sidewall.

4. A tubeless tire according to claim 1 wherein the thickness of rubber between the base of the groove and the outermost cord of the tire reinforcement is not greater than 1 mm.

5. A tubeless tire according to claim 1 wherein the thickness of rubber between the base of the groove and the outermost cord of the tire reinforcement is not greater than one-half mm.

6. A tubeless tire according to claim 1 wherein the penetrations extend through the cord reinforcement to a depth of two to three layers of cord.

7. A tubeless tire according to claim 1 wherein to pitch between successive penetrations is approximately 10—12 mm.

* * * * *